Oct. 12, 1943.   F. A. FRITZSCH   2,331,385
LATHE TAILSTOCK
Filed Feb. 11, 1942   2 Sheets-Sheet 1
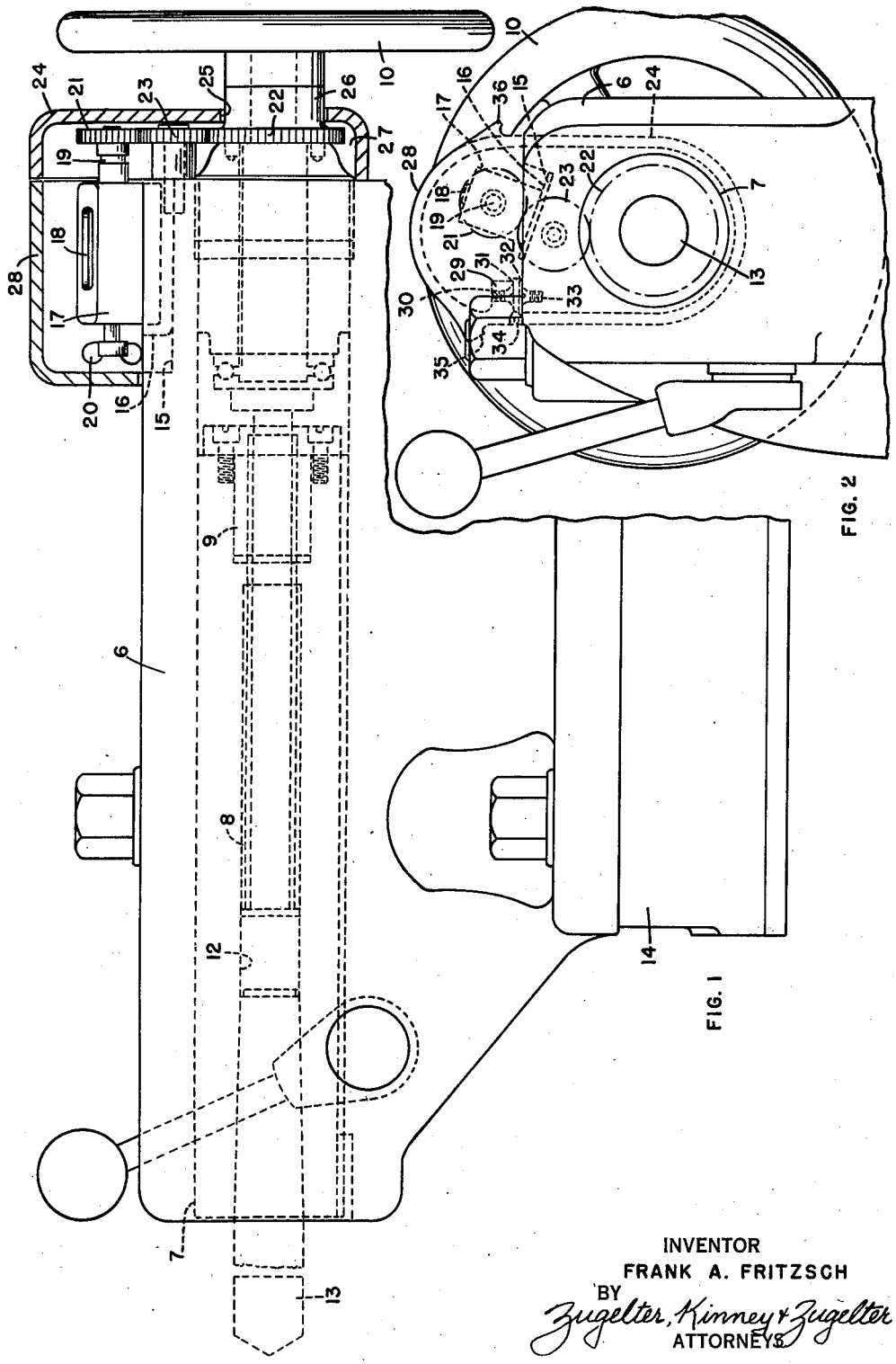
INVENTOR
FRANK A. FRITZSCH
BY
Zugelter, Kinney & Zugelter
ATTORNEYS Oct. 12, 1943.     F. A. FRITZSCH     2,331,385
LATHE TAILSTOCK
Filed Feb. 11, 1942     2 Sheets-Sheet 2
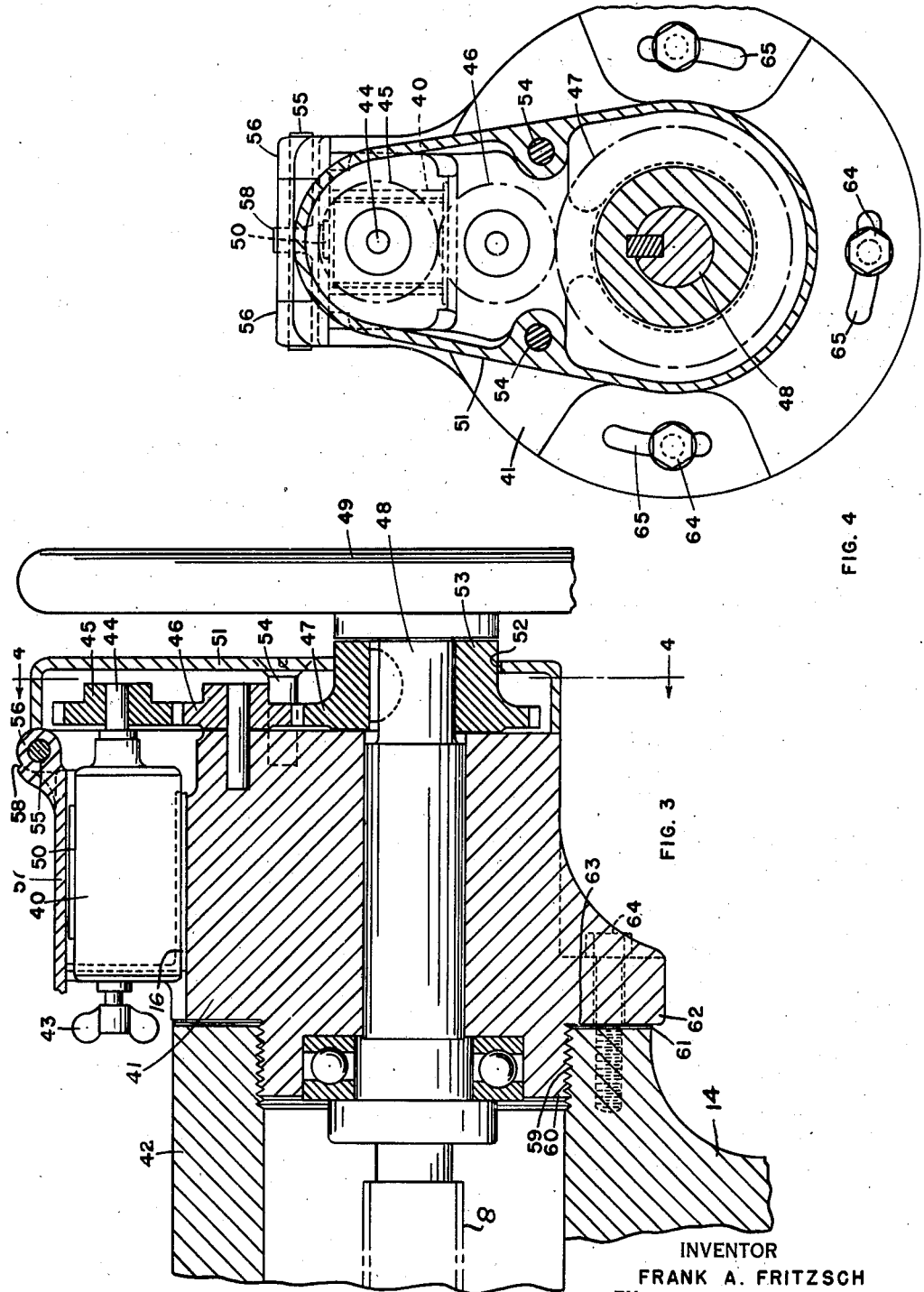
INVENTOR
FRANK A. FRITZSCH
BY
Zugelter, Kinney & Zugelter
ATTORNEYS Patented Oct. 12, 1943

2,331,385

UNITED STATES PATENT OFFICE 2,331,385

LATHE TAILSTOCK

Frank A. Fritzsch, Cincinnati, Ohio, assignor to The Lodge & Shipley Machine Tool Company, Cincinnati, Ohio, a corporation of Ohio Application February 11, 1942, Serial No. 430,417

6 Claims. (Cl. 82—31)

This invention relates to improvements in the tail stock of a lathe.

An object of the invention is to provide in a tail stock structure, improved means to facilitate and expedite use of a lathe for the drilling of holes uniformly to a specified depth, or, stating it broadly, to repeatedly advance and retract the tail stock spindle measured distances, with a high degree of uniformity and with a substantial saving of time.

Another object is to provide simple and durable means for the purpose stated, which will relieve the machinist or operator of eye strain, unnecessary movements, and fatigue, thereby enabling him to speed the fabrication of machine parts and other products without added effort.

A further object of the invention is the elimination of arithmetical computations in advancing tail stock mounted tools uniformly through or along work pieces successively applied to and rotated with the head stock spindle of a lathe.

The foregoing and other objects are attained by the means described herein and disclosed in the accompanying drawings, in which:

Fig. 1 is a side elevational view of the improved lathe tailstock, part being broken away to illustrate interior construction.

Fig. 2 is a fragmental end elevation of the tailstock as viewed from left to right of Fig. 1.

Fig. 3 is a fragmental cross-sectional view of a tailstock embodying a modification.

Fig. 4 is a cross-sectional view taken on line 4—4 of Fig. 3.

As is well known to persons in the machinery art, lathes are sometimes used for certain special operations such as the drilling of holes, by mounting a tool in the tapered bore of the tailstock spindle, and rotating a work piece relative thereto by attaching the work piece to the live spindle through the intermediary of a chuck, face plate, or other suitable holder. When so using the lathe, the feeding of the tool to the work piece was accomplished by rotating the tailstock spindle screw manually, and, upon completion of the operation, withdrawing the tool by reversing the direction of screw rotation. The spindle feed screw ordinarily is provided with a handwheel for effecting the spindle advancing and retracting movements.

In order to enable the machinist to determine the extent of the tool feed under the circumstances related above, it was customary to furnish the tailstock spindle with scale markings, usually by cutting lines on the spindle to indicate feed advancements as fine as 1/16 inch. The scale markings would emerge from the tailstock barrel successively as the spindle handwheel was rotated by the machinist in feeding the tool to the work piece.

The usual practice was to insert the drill into the center hole of the tailstock spindle, and clamp the tailstock to the lathe bed so that the drill point was just sufficiently distant from the work piece to permit application and removal of the work piece to the holding means of the headstock. Then by rotating the tailstock handwheel, the spindle and drill were advanced until the point of the drill entered the work piece up to the full diameter of the drill. At this point, the machinist noted the reading on the spindle scale at the face of the tailstock barrel, and then added to the reading the depth of hole to be drilled. This procedure invariably involved calculations in fractions of an inch, and mistakes resulting from errors in calculations were not uncommon. Objectionable also under the common practice related, was the painstaking and time-consuming effort required on the part of the machinist, in finding the proper scale line at which to stop feeding the drill, as the scale markings emerged one by one from the spindle barrel. The scale markings being fine, and sometimes covered with lubricant, it was no easy matter for the machinist to find the proper line at which to stop feeding the drill. Moreover, the task was rendered additionally tedious by reason of the fact that the scale markings had to be watched while at the same time the machinist actuated the spindle handwheel, and in many instances no adequate provision was made for properly illuminating the region around and about the spindle scale. All of this detracted from the efficiency and the ability of the machinist to perform his duties with speed and accuracy, and resulted in unnecessary mental and bodily fatigue which likewise interfered with efficiency and speed of production. Moreover, it was nearly impossible to secure uniformity in the depth of holes drilled by the method outlined above, without the exercise of extraordinary and painstaking care which naturally resulted in fatiguing effort and a loss of valuable time.

All of the foregoing objections are effectively eliminated by means of the present invention, which simplifies, facilitates and expedites the entire procedure.

Referring first to the illustrations of Figs. 1 and 2, the character 6 indicates the barrel of a lathe tailstock, in which is reciprocally mounted the spindle 7. As in ordinary practice a screw 8 cooperates with a nut 9 carried by the spindle, in advancing and retracting the spindle as the handwheel 10 is rotated in one direction or the other. The spindle has the customary tapered center hole or bore 12 at its forward end, which normally embraces a dead center, but which in special drilling operations may accommodate also the shank of a drill or other tool 13. Except to state that the handwheel 10 is fixed to the rear end of the spindle feed screw, it is deemed unnecessary to further dwell upon the specific means contained within the spindle barrel for supporting the spindle and the feed screw, and for precluding rotation of the spindle as it is advanced and retracted by the action of the screw. It will be understood, of course, that the base portion 14 of the tailstock is adapted to be fixed upon the lathe bed at any desired location, in accordance with common practice.

In accordance with the disclosure of Figs. 1 and 2, the rear upper portion of the barrel may be recessed to provide an incline 15 forming a seat upon which may be mounted the base 16 of a revolution counter whose casing is indicated at 17. The device 17 may be a cyclometer or any other apparatus for recording revolutions of a wheel, and in the preferred form of the counter, there is furnished a window 18 through which may be viewed the counting wheels of the device. The counter is of standard design and may be purchased on the open market. The counter wheels, as is well-known, will count and indicate the rotations imparted to the main shaft 19 of the counting device. By rotating the main shaft 19 in one direction the successive complete rotations will be added up by the counting wheels, whereas by rotating the main shaft in opposite direction, the complete rotations will be subtracted. A resetting lever or finger piece 20 of the counter, serves to restore the counter wheels to zero reading whenever such resetting may be desired.

Upon the rear end of the main shaft 19 of the counter, there is keyed or otherwise fixedly secured a gear 21. This gear is to be driven from a main gear 22 fixed for rotation with the handwheel 10, and in the embodiment illustrated herein, it is expedient to provide an intermediate gear 23 for completing the drive and rotating the counter in proper direction to add revolutions as the handwheel is rotated in clockwise direction, and to subtract revolutions as the handwheel is reversely rotated. As an example of a proper transmission ratio of gearing to be employed, the feed screw 8 may be of 0.2" pitch, with the circumference of gear 21 being half the circumference of gear 22. In other words, the ratio of driver to driven gear is two to one, and since the counter records each rotation of its main shaft, the 0.2" pitch of the feed screw will cause the counter to register 10 for each $\frac{1}{10}$" linear advancement of the spindle. By properly placing the decimal point at the window of the counter, the indications upon the counter wheels will be observable in inches and tenths and hundreds of an inch, as the handwheel is rotated to advance the spindle and the tool held thereby. By altering the ratio of the drive between the feed screw and the main shaft of the counter, the arrangement may be rendered accurately operative for any pitch value of the spindle feed screw, as will be understood.

In order that the mechanism including the counter and the various gears 21, 22 and 23 might be protected against abuse or injury, it is considered desirable to provide a gear case 24 upon the end of the tailstock barrel, this case being preferably apertured as at 25 to accommodate the hub 26 of gear 22. The lower end of the gear case, at the location 27 may be adapted to contain a suitable lubricant for the gears.

Forwardly of the gear case 24, there may be provided a protective cover 28 for the counter. This cover may be of any acceptable design or configuration, and will preferably be hinged to the tailstock so as to be displaceable and to thereby expose the counter window when necessary. As herein shown, the cover 28 is substantially semi-cylindrical in shape, and includes an interior flange 29 threaded to receive a screw 30 which secures one leaf 31 of a hinge to the cover. The other leaf 32 of the hinge may be screwed or otherwise fastened as at 33, to the body of the tailstock. The hinge pin is indicated at 34.

If desired, although not of necessity, the cover may be provided with a stop lug 35 for limiting the extent to which the cover may be swung about its hinged mounting. The character 36 indicates a finger piece or handle to be grasped in swinging the cover to the open position. As previously stated herein, the seat 15 for the counter preferably is inclined downwardly in the direction of the operator's station at the front of the lathe in order to render the counter wheels readily observable to the operator. With counters having windows located elsewhere than at the top thereof, the inclined seat may be dispensed with provided that the window is within the line of sight of the operator normally stationed at the front of the lathe. From the foregoing, it will be understood that the nature of the counter may determine its angularity and its location upon the tailstock of the lathe.

In the modified structure illustrated by Figs. 3 and 4, 40 indicates the counter, which in this instance is mounted upon the bell end 41 of a barrel 42, which together constitute the frame of the tailstock. The counter includes a reset lever 43 and a main shaft 44 to which is fixedly mounted the gear 45. Through the agency of an idler gear 46, the main shaft 44 of the counter may be driven from the gear 47 which is keyed or otherwise fixed to the feed screw 48 so as to rotate with the handwheel 49 which is likewise fixed to the end of the screw. The frame for the window of the counter is indicated at 50, and through it may be observed the numbered wheels of the counter.

In this embodiment of the invention, the bell end of the frame is provided with an end cover 51 housing the various gears 45, 46 and 47, and as in the Fig. 1 disclosure, may be apertured at 52 to accommodate the hub 53 of gear 47. One or more screws or other fasteners 54 may be utilized for holding the cover in place. At its upper end, the cover 51 may carry a series of hinge barrels supporting a hinge pin 55 that passes through cooperative hinge barrel means 56 on a protective cover 57 that overlies the window of the counter. The hinge barrel 56 may carry a stop 58 to abut the top of the end cover 51 for limiting the swinging movement of the protective cover. With the protective cover hinged to the end cover 51, it will be seen to be in such close proximity with the rim of the handwheel as to furnish ready access to the counter window, the operator being thereby enabled to use one hand in adjusting the handwheel and manipulating the counter cover. The arrangement is common to Figs. 1 and 3, both of which drawing views disclose the proximity of the cover to the handwheel rim.

It should be understood that the bell end 41 of the tailstock ordinarily is detachable from the spindle barrel, the usual mounting therefor being effected by means of screw threads 59 complementarily formed within the spindle barrel and upon the annular reduced end 60 of the bell end. By placing shims 61 between the bell end flange 62 and the terminal end 63 of the spindle barrel, the bell end may be drawn up tightly against the spindle barrel, with disposition of the counter window to various degrees of angularity from a vertical plane, so as to place the window in the direct line of sight of an operator stationed at the front of the machine. If necessary or desirable, the bell end may be locked in any adjusted position of rotation with respect to the spindle barrel, by means of one or more locking bolts 64. The locking bolt may pass through an elongated opening 65 of the bell end, to provide for the desired angularity of adjustment.

It will readily be appreciated that the use of shims 61 may be considered an alternative of the use of the locking bolts 64, and that the use of the locking bolts may render unnecessary the screw thread connection indicated at 59. Other such modifications and changes in structural details will at once manifest themselves to the skilled mechanic.

To use the machine embodying the present invention, the following steps will be logically employed. First, the drill or tool will be inserted into the tapered bore of the tailstock spindle, and the tailstock will be moved bodily toward the work piece carried by the headstock, to a position at which the work piece may be applied and removed without interference with the tool. The work piece will then be rotated by the headstock spindle, and the operator will then manipulate the tailstock handwheel to advance the drill into the work up to the full diameter of the drill. At this point, the counter is set to the zero reading, by actuating the reset lever of the counter. The operator then proceeds to turn the handwheel and advance the tool into the work piece until the required depth of cut appears in decimal values upon the wheels of the counter. As previously stated, the counter will indicate the tool advancement in inches and tenths and hundredths of an inch. Upon reaching the desired depth of cut, the operator will simply reverse the rotation of the tailstock handwheel to withdraw the tool from the work piece, and this reversal or retractile movement will result in reverse operation of the counter to subtract rotations of the handwheel. Thus, the counter will add and subtract rotational movements of the handwheel, and will accordingly always indicate the same figure at any given position of the spindle. It will therefore be evident that repetitive work will never require a resetting of the counter for successive operations upon identical work pieces, and the drilling operation will be performed with a high degree of uniformity upon every work piece operated upon.

The use of the means of this invention is highly superior to the means heretofore employed in operations of the character herein described, as it ensures a high degree of uniformity without waste of time and expenditure of painstaking effort on the part of the operator. Moreover, the operator is not required to stoop or otherwise discomfort himself in the performance of his work. The calculating of tool feeds in fractions of an inch is entirely eliminated, thereby resulting in the elimination of errors due to miscalculation. An operator having the means of this invention at his disposal, may easily speed production to a material extent and the effort required to do so will be considerably less than that experienced under the old practice.

It is to be distinctly understood that the disclosures herein are exemplary only of various modes of applying the invention, since alterations and changes in structural details will depend largely upon the type of tailstock to be equipped in accordance with the teaching herein. Such alterations as may be necessary to adapt the invention to the various forms of tailstocks, are accordingly contemplated within the scope of the invention as covered by the language of the claims appended hereto.

What is claimed is:

1. A lathe tailstock arranged for achieving a high degree of uniformity and speed in successively operating upon work pieces mounted for rotation by the headstock structure of the lathe, said tailstock including a spindle supporting means, and comprising in combination a nonrotating spindle mounted for reciprocation relative to said supporting means, means on the spindle for fixedly mounting a tool thereon, means including a rotatable feed shaft for advancing and retracting the spindle linearly relative to the tailstock, and a revolution counter including drive means therefor synchronized with rotational movements of the spindle feed shaft, for indicating linear travel of the spindle and the tool mounted thereon, and a mounting member for the counter adjustable rotationally about the axis of the feed shaft to dispose the counter at various locations upon an orbit whose center is the feed shaft axis.

2. A lathe tailstock arranged for achieving a high degree of uniformity and speed in successively operating upon work pieces mounted for rotation by the headstock structure of the lathe, said tailstock including a spindle supporting means, and comprising in combination a nonrotating spindle mounted for reciprocation relative to said supporting means, means on the spindle for fixedly mounting a tool thereon, means including a rotatable feed shaft for advancing and retracting the spindle linearly relative to the tailstock, and a revolution counter including drive means therefor synchronized with rotational movements of the spindle feed shaft, for indicating linear travel of the spindle and the tool mounted thereon, a mounting member for the counter adjustable rotationally about the axis of the feed shaft to dispose the counter at various locations upon an orbit whose center is the feed shaft axis, and a protective counter cover on the counter mounting member and movable likewise along an orbit concentric with orbital movements of the counter.

3. A lathe tailstock arranged for achieving a high degree of uniformity and speed in successively operating upon work pieces mounted for rotation by the headstock structure of the lathe, said tailstock including a spindle supporting means, and comprising in combination a nonrotating spindle mounted for reciprocation relative to said supporting means, means on the spindle for fixedly mounting a tool thereon, means including a rotatable feed shaft for advancing and retracting the spindle linearly relative to the tailstock, and a revolution counter including drive means therefor synchronized with rotational movements of the spindle feed shaft, for indicating linear travel of the spindle and the tool mounted thereon, a mounting member for the counter adjustable rotationally about the axis of the feed shaft to dispose the counter at various locations upon an orbit whose center is the feed shaft axis, and a protective counter cover on the counter mounting member and movable likewise along an orbit concentric with orbital movements of the counter, and means pivoting said protective cover for movement through an arc whose plane includes the axis of rotation of the spindle feed shaft.

4. A lathe tailstock arranged for achieving a high degree of uniformity and speed in successively operating upon work pieces mounted for rotation by the headstock structure of the lathe, said tailstock including a spindle supporting means, and comprising in combination a non-rotating spindle mounted for reciprocation relative to said supporting means, means on the spindle for fixedly mounting a tool thereon, means including a rotatable feed shaft for advancing and retracting the spindle linearly relative to the tailstock, and a direct reading revolution counter including an actuating shaft and a pinion thereon, and drive means therefor synchronized with rotational movements of the spindle feed shaft, for indicating linear travel of the spindle and the tool mounted thereon, and a mounting member for the counter adjustable rotationally about the axis of the feed shaft to dispose the counter at various locations upon an orbit whose center is the feed shaft axis, the driving means for said counter comprising a gear fixed concentrically upon the feed shaft, a second gear rotatably supported upon the rotationally adjustable mounting member in meshing relationship to the first mentioned gear, said second gear being bodily shiftable with said rotationally adjustable mounting member and in constant mesh with the revolution counter pinion to drive the counter irrespective of the positions of rotational adjustment of the mounting member, and means for zeroising the counter reading indicated incident to making the rotational adjustments aforesaid.

5. In a lathe tailstock, the combination which comprises: a frame having a longitudinal bore therein, a non-rotatable hollow spindle supported for reciprocation within the bore, a spindle feed screw disposed within the hollow spindle and including means for reciprocating the spindle upon rotation of the screw, said screw having a rear end extending a fixed distance axially from the rear of the frame, a hand wheel fixed on the extending end of the screw for effecting rotation thereof, and a gear mounted axially on the screw intermediate the handwheel and the rear end of the frame, a seat on the frame, a multiple register-wheel direct-reading counter having an indicating device thereon and mounted upon the seat, said seat, frame, and counter being so arranged relative one to the other that the indicia on said counter is readily visible to an operator stationed at one side of said frame, said counter including a driving shaft arranged parallel to the spindle and screw, with the main shaft of the counter extended rearwardly to the plane of the gear aforesaid, means associated with the rearwardly extended end of the counter main shaft effecting a direct driving connection with the gear on the spindle advancing screw, and means for resetting the counter to zero reading independently of extended positions of the spindle relative to the frame.

6. In a lathe tailstock, the combination which comprises: a frame having a longitudinal bore therein, a non-rotatable hollow spindle supported for reciprocation within the bore, a spindle feed screw disposed within the hollow spindle and including means for reciprocating the spindle upon rotation of the screw, said screw having a rear end extending axially from the rear of the frame, a handwheel fixed on the extending end of the screw for effecting rotation thereof, and a gear mounted axially on the screw intermediate the handwheel and the rear end of the frame, a seat on the frame in close proximity with the rim of the handwheel, a hinged cover overlying said seat and so arranged relative to the handwheel as to be manipulated substantially concurrently with actuation of the handwheel by an operator's one hand, a multiple register-wheel direct-reading counter having indicia thereon and mounted upon the seat beneath the cover, said seat, frame and counter being so arranged relative one to the other that the indicia on said counter is readily visible to an operator stationed at one side of the frame, said counter including a driving shaft arranged parallel to the spindle and screw, with the main shaft of the counter extended rearwardly to the plane of the gear aforesaid, means associated with the rearwardly extended end of the counter main-shaft effecting a direct driving connection with the gear on the spindle advancing screw, and means for resetting the counter to zero reading independently of extended positions of the spindle relative to the frame.

FRANK A. FRITZSCH.